US009002959B2

(12) United States Patent
Veeramachaneni et al.

(10) Patent No.: US 9,002,959 B2
(45) Date of Patent: *Apr. 7, 2015

(54) WEB FEED PRESENCE

(75) Inventors: Jithendra K. Veeramachaneni, Sammamish, WA (US); Oludare Obasanjo, Seattle, WA (US); Stephen R. Gordon, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/532,193

(22) Filed: Jun. 25, 2012

(65) Prior Publication Data

US 2012/0265820 A1 Oct. 18, 2012

Related U.S. Application Data

(63) Continuation of application No. 11/380,158, filed on Apr. 25, 2006, now Pat. No. 8,209,383.

(51) Int. Cl.
*G06F 15/16* (2006.01)
*H04L 29/08* (2006.01)

(52) U.S. Cl.
CPC ..................................... *H04L 67/24* (2013.01)

(58) Field of Classification Search
CPC ....... H04L 51/32; H04L 67/24; H04L 12/581; H04L 12/588; H04L 51/04; H04L 41/22; H04L 51/00; G06F 17/3089; G06F 21/6254; G06Q 10/10; G06Q 50/01
USPC ......... 709/217–219, 203–206, 223, 228–229, 709/231; 715/202, 501, 751–752, 733; 455/344, 412, 414
See application file for complete search history.

(56) References Cited

U.S. PATENT DOCUMENTS

| | | | | |
|---|---|---|---|---|
| 5,790,803 | A * | 8/1998 | Kinoshita et al. | 709/245 |
| 6,699,125 | B2 | 3/2004 | Kirmse et al. | |
| 7,558,828 | B1 * | 7/2009 | Panzer | 709/206 |
| 7,818,392 | B1 * | 10/2010 | Martino et al. | 709/217 |
| 2003/0126250 | A1 | 7/2003 | Jhanji | |
| 2005/0044144 | A1 | 2/2005 | Malik et al. | |
| 2005/0165584 | A1 * | 7/2005 | Boody et al. | 702/186 |
| 2005/0198031 | A1 * | 9/2005 | Pezaris et al. | 707/9 |
| 2005/0198299 | A1 | 9/2005 | Beck et al. | |
| 2005/0251555 | A1 * | 11/2005 | Little | 709/206 |
| 2005/0273503 | A1 * | 12/2005 | Carr et al. | 709/219 |
| 2005/0289147 | A1 * | 12/2005 | Kahn et al. | 707/10 |
| 2005/0289468 | A1 * | 12/2005 | Kahn et al. | 715/738 |
| 2006/0036748 | A1 | 2/2006 | Nusbaum et al. | |
| 2006/0101035 | A1 * | 5/2006 | Mustakallio et al. | 707/100 |
| 2006/0221857 | A1 * | 10/2006 | Bushnell et al. | 370/254 |
| 2006/0265508 | A1 | 11/2006 | Angel et al. | |
| 2007/0022174 | A1 * | 1/2007 | Issa | 709/217 |

(Continued)

OTHER PUBLICATIONS

Google Talk, Available at <<http://web.archive.org/web/20060209024019/http://www.google.com/talk/start.html#custom>>, Feb. 9, 2006, pp. 1-6.

(Continued)

*Primary Examiner* — Wing F Chan
*Assistant Examiner* — Benjamin M Thieu
(74) *Attorney, Agent, or Firm* — Bryan Webster; Kate Drakos; Micky Minhas

(57) ABSTRACT

Web feed presence techniques are described herein. In an implementation, a method includes obtaining a web feed describing content of the user and presence data of the user. The web feed is output with the presence data concurrently.

13 Claims, 5 Drawing Sheets

(56) References Cited

U.S. PATENT DOCUMENTS

| | | |
|---|---|---|
| 2007/0156824 A1 | 7/2007 | Thompson |
| 2007/0162432 A1* | 7/2007 | Armstrong et al. ............... 707/3 |
| 2007/0225047 A1 | 9/2007 | Bakos |
| 2007/0250577 A1 | 10/2007 | Veeramachaneni et al. |
| 2008/0126476 A1* | 5/2008 | Nicholas et al. .............. 709/203 |
| 2011/0289011 A1* | 11/2011 | Hull et al. .................... 705/319 |

OTHER PUBLICATIONS

Office Action for U.S. Appl. No. 11/380,158, mailed on Apr. 15, 2011, Jithendra K. Veeramachaneni, "Web Feed Presence", 29 pgs.

Non-Final Office Action for U.S. Appl. No. 11/,380,158, mailed on Sep. 16, 2011, Jithendra K. Veeramachaneni, "Web Feed Presence", 30 pages.

* cited by examiner

WEB FEED PRESENCE

CROSS REFERENCE TO RELATED APPLICATIONS

This patent application is a continuation of, and claims priority to commonly assigned co-pending, U.S. patent application Ser. No. 11/380,158, filed Apr. 25, 2006, entitled "Web Feed Presence", which application is incorporated herein by reference in its entirety.

BACKGROUND

The amount of information that is available to users over a network and the speed at which this information is available is ever increasing. For example, users may access news websites to read up-to-date articles even before those articles are available via traditional newspapers and broadcast television. Therefore, these websites may be used as a primary source of information by the users to learn about their surroundings.

Additionally, the types of techniques that may be employed by the users to obtain information is also ever increasing. One such technique is commonly referred to as a "web log" or "blog". Web logs are typically provided as an online journal that is available via the web to other users. A "blogger", for instance, may create and maintain posts for access by other users. Generally, the posts are limited only by the imagination of the blogger and therefore may range between a wide variety of subjects, e.g., from a personal diary to interviews regarding the news of the day. Because of this range of subjects, different blogs may be of interest to different subsets of the users. A variety of other types of techniques are also available.

One technique that has been developed to locate and consume portions of this information by different subsets of users is through the use of "web feeds". A web feed, for instance, may contain items taken from news websites and blogs that are "published" via the web feed over the network to users. In this way, the users are made aware of the content described in the web feeds. For example, the items may contain summaries of stories, posts to web logs, and so on, that may be read by the user through use of a reader that obtains the web feed from over a network.

Traditional web feeds, however, did not include presence data relating the content included in the web feed, such as the online status of a user that originated the content described in the web feed. Therefore, although the web feed may be used to disseminate information, this information did not indicate availability of the originator (e.g., the "blogger") for further communication, such as whether the blogger was currently "online". Thus, these traditional techniques limited real-time interaction between the originator and consumers of the content.

SUMMARY

Web feed presence techniques are described herein. In an implementation, a method includes obtaining a web feed describing content of the user and presence data of the user. The web feed is output concurrently with the presence data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The same reference numbers are utilized in instances in the discussion to reference like structures and components.

DETAILED DESCRIPTION

Overview

Because of the amount of information that is available to users, techniques have been developed to "sift-through" this information to find particular information that is of interest to respective users. One such technique is through the user of a "web feed". A web feed, for instance, may be provided as a document that is published over a network (e.g., the Internet) that describes content, such as by including content itself (e.g., an article), a portion of the content (e.g., a summary of the article), and/or link to the content. Therefore, users may subscribe to particular web feeds to be kept informed as to content described by the web feed, such as a particular web log. For instance, the users may consume the web feed via personalized web portal pages, web browsers, standalone applications, through a plug-in module to an email reader, and so on.

Traditional techniques that were used to publish and consume web feeds, however, did not indicate a "presence" of an originating user of the content. For example, while a web feed may indicate that a new post was added to a particular web log, the web feed did not indicate whether the originating user was available "online" or "how" the originating user is available, e.g., via instant messaging. Therefore, if the recipient of the web feed wished to contact the originating user, the recipient was forced to guess whether the originating user was available and how to contact the user, which was both frustrating and inefficient and therefore did not provide for "real time" interaction between the users. Accordingly, web feed presence techniques are described such that content from an originating user described in a web feed may incorporate presence data of the originating user such that a recipient of the web feed may readily determine availability of the originating user to communicate with the recipient.

In the following discussion, an exemplary environment is first described that is operable to perform web feed presence techniques. Exemplary procedures and user interfaces are then described that may be employed in the exemplary environment, as well as in other environments.

Exemplary Environment

Figure 1:
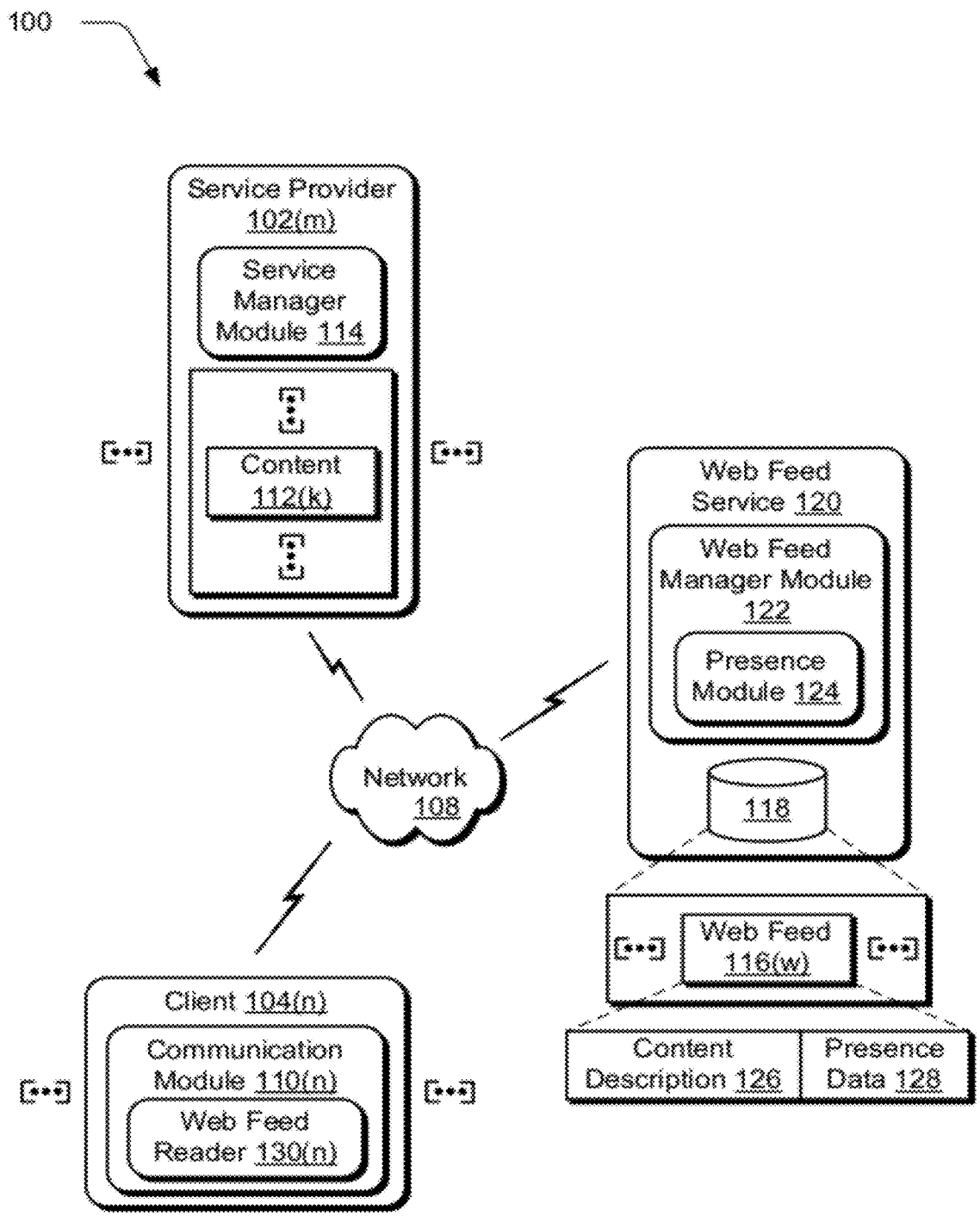
FIG. 1 is an illustration of an environment in an exemplary implementation that is operable to web feed presence techniques.

FIG. 1 is an illustration of an environment 100 in an exemplary implementation that is operable to employ web feed presence techniques. The illustrated environment 100 includes one or more service providers 102(m) (where "m" can be any integer from one to "M"), one or more clients 104(n) (where "n" can be any integer from one to "N"), and a web feed service 120 that are communicatively coupled, one to another, via a network 108. In the following discussion, the service provider 102(m) and the client 104(n) may be representative of one or more entities, and therefore reference may be made to a single entity (e.g., the client 104(n)) or multiple entities (e.g., the clients 104(n) or the plurality of clients 104(n)).

The clients 104(n) may be configured in a variety of ways for network 108 access. For example, one or more of the clients 104(n) may be configured as a computing device, such as a desktop computer, a mobile station, an entertainment appliance, a set-top box communicatively coupled to a display device, a wireless phone, a game console, and so forth. Thus, the clients 104(n) may range from full resource devices with substantial memory and processor resources (e.g., personal computers, game consoles) to low-resource devices with limited memory and/or processing resources (e.g., traditional set-top boxes, hand-held game consoles). The clients 104(n), in portions of the following discussion, may also relate to a person and/or entity that operate the clients. In other words, one or more of the clients 104(n) may describe logical clients that include users, software, and/or devices.

Although the network 108 is illustrated as the Internet, the network may assume a wide variety of configurations. For example, the network 108 may include a wide area network (WAN), a local area network (LAN), a wireless network, a public telephone network, an intranet, and so on. Further, although a single network 108 is shown, the network 108 may be configured to include multiple networks.

The client 104(n), as illustrated, includes a communication module 110(n). The communication module 110(n) is representative of an executable module that is configured to communicate over the network 108. For example, the communication module 110(n) may be configured as a web browser that allows the client 104(n) to "surf" the Internet. In another example, the communication module 110(n) is configured as a "smart" client module that is configured to provide other network functionality as a part of its operation, such as an instant messaging module, an email module, an online banking module, and so on. A wide variety of other examples are also contemplated.

As previously described, a wide variety of content may be accessible to the client 104(n) over the network, which is illustrated in FIG. 1 as content 112(k) (where "k" can be any integer from one to "K") available via the service provider 102(m). The service provider 102(m), for instance, may execute a service manager module 114 to provide the content 112(k) as requested by the client 104(n) for communication over the network 108.

One technique that may be utilized to keep the client 104(n) informed as to the status of the content 112(k) is through the use of a web feed 116(w), where "w" can be an integer from one to "W". The web feeds 116(w) are illustrated in storage 118 of a web feed service 120. The web feed service 120 may be configured in a variety of ways. For example, the web feed service 120 may be configured as an intermediate service between the service provider 102(m) and the client 104(n). The web feed service 120, for instance, is illustrated as including a web feed manager module 122 that is representative of functionality to obtain web feeds 116(w) via the network 108. The web feed manager module 122, when executed, may locate uniform resource locators (URLs) of web feeds originating from the service provider 102(m) and store the web feeds 116(w) obtained via the URLs in storage 118. The web feed manager module 122 may then communicate the web feeds 116(w) over the network 108 to the client 104(n) as directed. Further discussion of the web feed service 120 as implemented as an intermediate service may be found in relation to FIG. 2.

The web feed manager module 122 is also illustrated as including a presence module 124 which is representative of functionality to determine presence of users that originated respective content 122(k). The web feed manager module 122, for instance, may retrieve web feeds 116(w) from the service provider 102(m) to be stored in storage 118 as web feed 116(w). The web feed manager module 122 may also execute the presence module 124 to determine a presence of each user for a respective web feed, such as a "blogger" of a particular "blog". The web feed 116(w) may then be processed to include a content description 126 (e.g., a new post, a reference to a new post, and so on) and presence data 128 of the user that originated the content of the content description 126. The processed web feed 116(w) may then be communicated over the network 108 to the client 104(n) for output using the communication module 110(n).

The communication module 110(n), for instance, is illustrated as including a web feed reader 130(n) that is representative of functionality to consume a web feed 116(w) for output. The web feed read 130(n) may then cause an output of the content description 126 and the presence data 128 of the web feed 116(w) for concurrent viewing by a user. Thus, the user is informed as to the presence of the originator of the content described in the web feed 116(w) and may use this information to decide whether communication with the originator is available.

Although this example described the web feed service 120 as a stand-alone service, the environment 100 may be rearranged in a variety of different ways. For example, functionality of the web feed service 120 may be incorporated within the communication module 110(n) locally at the client 104(n). Therefore, the client 104(n) may subscribe to and obtain web feeds 116(w) directly from the service providers 102(m) without use of an "intermediate" service. A variety of other examples are also contemplated.

Generally, any of the functions described herein can be implemented using software, firmware (e.g., fixed logic circuitry), manual processing, or a combination of these implementations. The terms "module," "functionality," and "logic" as used herein generally represent software, firmware, or a combination of software and firmware. In the case of a software implementation, the module, functionality, or logic represents program code that performs specified tasks when executed on a processor (e.g., CPU or CPUs). The program code can be stored in one or more computer readable memory devices, further discussion of which may be found in relation to the following figure. The features of the web feed presence techniques described below are platform-independent, meaning that the techniques may be implemented on a variety of commercial computing platforms having a variety of processors.

Figure 2:
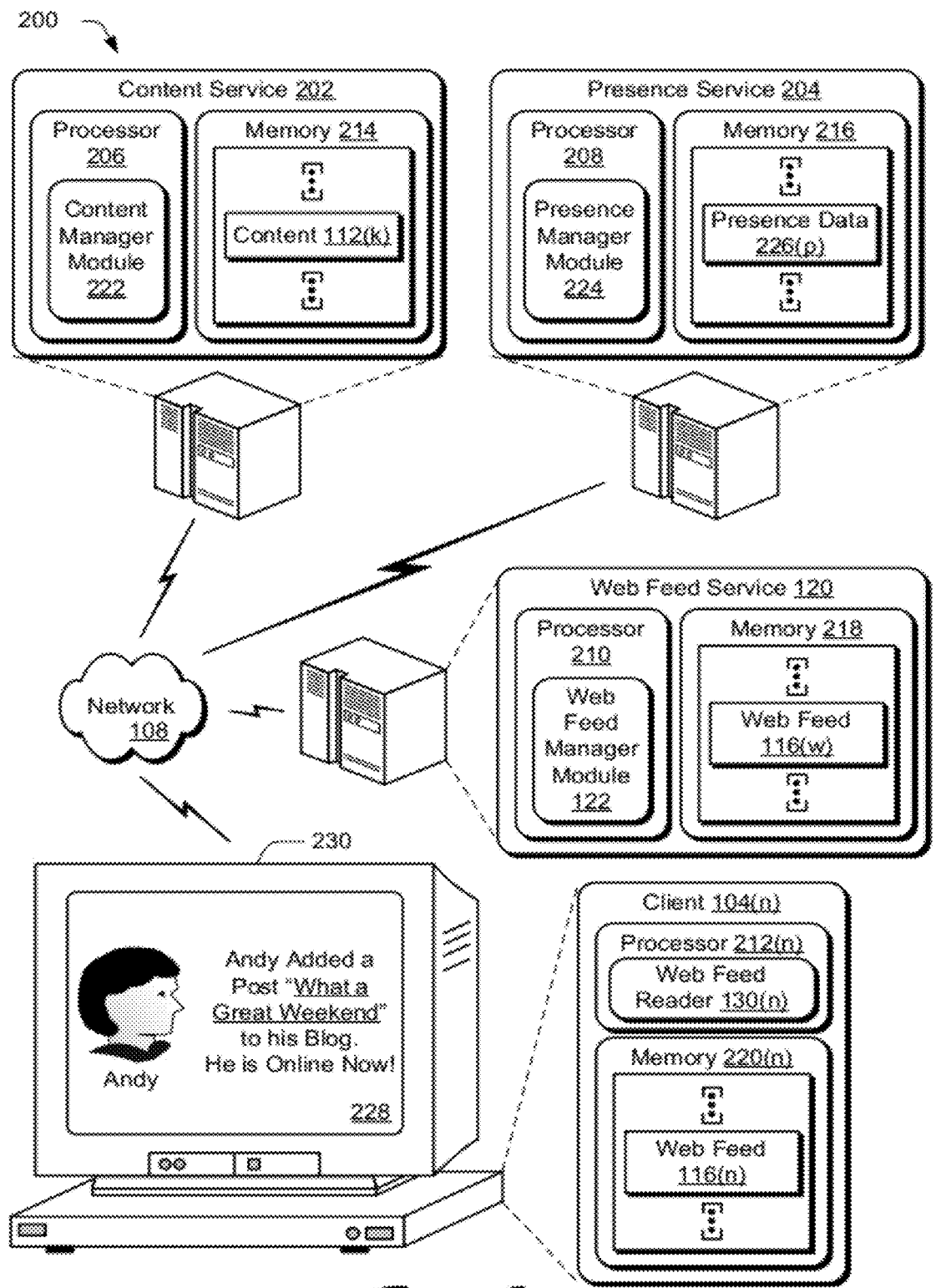
FIG. 2 is an illustration of a system in an exemplary implementation showing service providers of FIG. 1 as being implemented by a content service and a presence service, a web feed service of FIG. 1 as an intermediate service, and a client of FIG. 1 as a client device.

FIG. 2 is an illustration of a system 200 in an exemplary implementation showing the service providers 102(m) of FIG. 1 as being implemented by a content service 202 and a presence service 204, the web feed service 120 as an intermediate service, and the client 104(n) as a client device.

The content service 202, the presence service 204 and the web feed service are illustrated in FIG. 2 as being implemented by respective servers and the client 104(n) is illustrated as a client device, each of which having respective processors 206, 208, 210, 212(n) and memory 214, 216, 218, 220(n). Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Alternatively, the mechanisms of or for processors, and thus of or for a computing device, may include, but are not limited to, quantum computing, optical computing, mechanical computing (e.g., using nanotechnology), and so forth. Additionally, although a single memory 214, 216, 218, 220 (n) is shown, respectively, for the content service 202, presence service 204, web feed service 120 and the client 104(n), a wide variety of types and combinations of memory may be employed, such as random access memory (RAM), hard disk memory, removable medium memory, and other types of computer-readable media.

The system 200 of FIG. 2 illustrates an exemplary implementation of the web feed service 120 as an "intermediate" service between the client 104(n) and the content and presence services 202, 204. The web feed service 102 is illustrated as executing the web feed manager module 122 on the processor 210, which is also storable in memory 218. As previously described, the web feed manager module 122 is representative of functionality to obtain web feeds 116(w). For example, the web feed manager module 122 may obtain the web feeds 116(w) from the content service 202, such as through interaction with the content manager module 222, which is illustrated as being executed on the processor 206 and is storable in memory 214. The web feed 116(w) may be configured in a variety of different ways (e.g., an eXtensible Markup Language (XML) document) and in a variety of formats, such as according to Real Simple Syndication (RSS), "Atom", and so on. The web feed 116(w) is then provided by the web feed manager module 122 over the network 108 to the client 104(n), which is illustrated as stored in memory 220(n) as web feed 116(n). In another example, the web feeds 116(w) are obtained directly by the client 104(n) from the content service 202, such as by subscribing to the web feed via a particular URL. A variety of other examples are also contemplated.

The illustrated system 200 also includes a presence service 204 having a presence manager module 224 (which may or may not correspond to the presence module 124 of FIG. 1) that is illustrated as being executed on the processor 208, and is storable in memory 216. The presence manager module 224 is representative of functionality to obtain presence data of particular users. For example, the presence service 204 may be incorporated as part of an instant messaging service that maintains presence data 226(p) describing users of the service, such as whether the user is "online" or "offline" and availability of the user to communicate (e.g., "busy", "away"). Thus, the presence data 226(p) may describe the availability and willingness of the user to communicate. It should be readily apparent that the presence data 226(p) is not limited to Internet Protocol (IP) communications such as instant messaging and voice over IP, but may also include a variety of other communication techniques, such as wireless telephone communication, and so on. The presence service 204 may also provide other information pertaining to the user, such as a personalized message, a user tile, and so on.

The presence data 226(p), along with the "other" information if so desired, may be obtained by the web feed service 120 for communication over the network 108 to the client 104(n). This communication may be performed in a variety of ways. For example, the web feed manager module 112 may embed the presence data 226(p) as metadata with the web feed 116(w) which describes the content 112(k) and then provide the embedded web feed 116(w) over the network 108 to the client 104(n). In another example, the presence data 226(p) may be configured as a "presence feed" which is communicated separately over the network 108 than the web feed 116(w) that describes the content 112(k) of the user. For example, the "presence feed" may be configured as a web feed that contains the presence data 226(p) (e.g., "online" or "offline") as well as the "other" data (e.g., a user tile and personalized message) that is readable by the web feed read 130(n) of the client 104(n) for output in a user interface 228.

As illustrated in FIG. 2, for instance, the illustrated client 104(n) includes a user interface 228 output via a display device 230. The user interface 228 includes a concurrent display of the web feed 116(w) which describes content of the user (e.g., "Andy added a post 'What a Great Weekend'") and presence data of the user, e.g., "He is Online Now". Thus, a user of the client 104(n) is made aware of the content 112(k) relating to the user as well as whether the user is available to communicate.

In another example, the content service 202 and the presence service 204 are integrated. For instance, a web feed provided by the content service 202 which configured as a "blog" service may also include presence data indicating whether the user is currently interacting with the service. A variety of other examples are also contemplated, further discussion of which may be found in relation to the following procedures.

Exemplary Procedures

The following discussion describes web feed presence techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
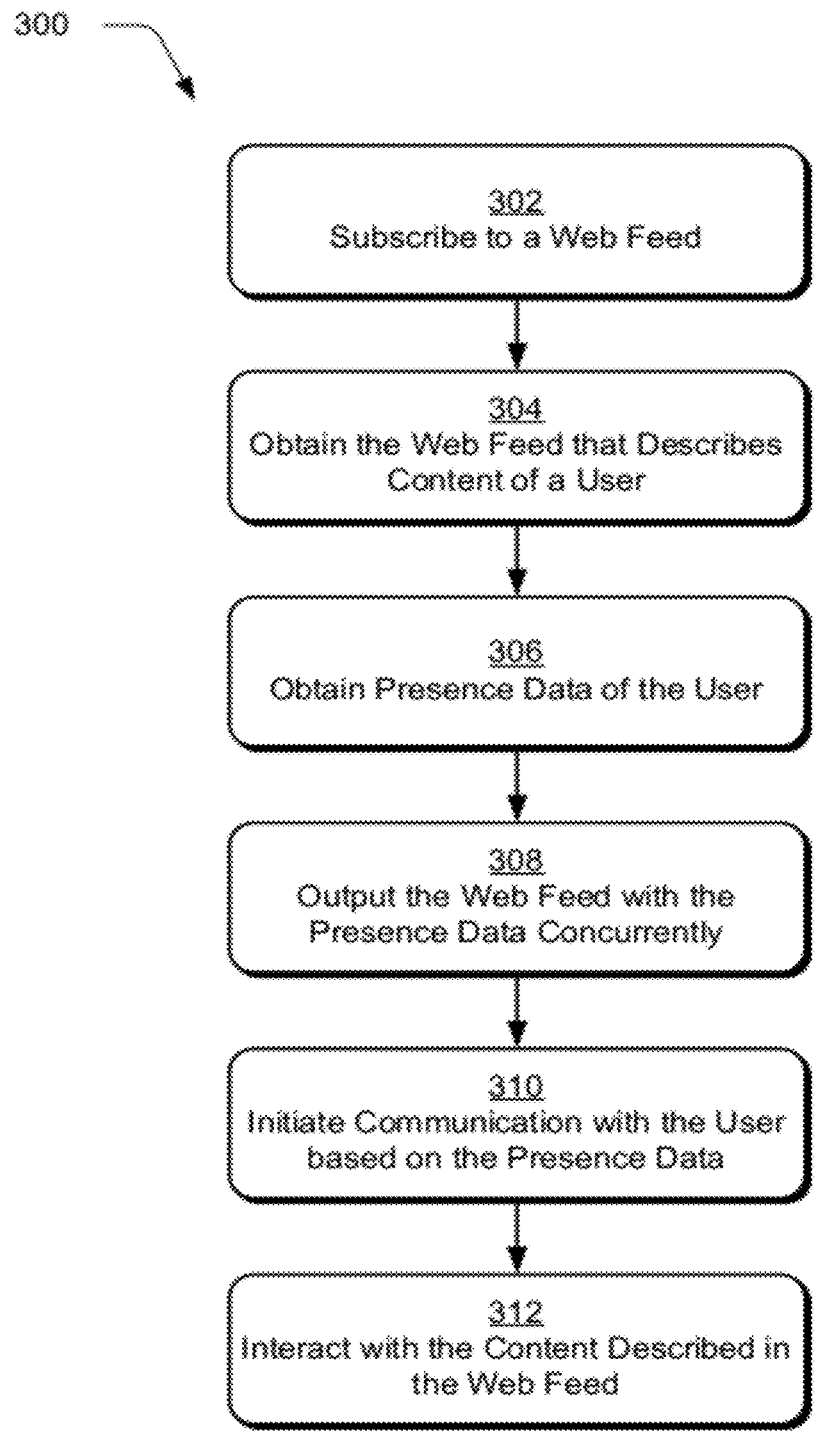
FIG. 3 is a flow diagram depicting a procedure in an exemplary implementation in which web feeds are utilized to provide presence data of a user.

FIG. 3 depicts a procedure 300 in an exemplary implementation in which web feeds are utilized to provide presence data of a user. A user subscribes to a web feed (block 302). For example, the user may interact with the web feed reader 130(n), configured as a RSS reader, to specify a list a web feeds that are of interest to the user, such as by providing a URL of each web feed.

A web feed is obtained that describes content of a user (block 304). Continuing with the previous example, the web feed reader 130(n) when executed by the client 104(n) may check the list of web feeds and obtain updated content referenced in the web feeds, such as summary of articles and/or the articles themselves. As previously described, the web feeds may be formatted in a variety of ways, such as according to Real Simply Syndication (RSS), Atom, and so on.

Further, the web feed reader 130(n) may be configured in a variety of ways, such as a standalone application, browser or aggregator executed locally on the client 104(n). In another example, the web feed is obtained by the web feed service 120 which acts as an intermediate service between the client 104 (n) and the content and/or presence services 202, 204 as described in relation to FIG. 2. A variety of other examples are also contemplated, such as by aggregating a plurality of web feeds to form a new web feed either locally by the client 104(n) or remotely by the web feed service 120 when configured as an intermediate service.

Presence data of the user is also obtained (block 306). Continuing with the previous examples, the presence data 226(p) may be obtained as a "stand-alone" feed from the presence service 204 that includes the presence data 226(p), such as whether the user is available online. In another example, the presence data 226(p) may be included with the web feed 116(w) that describes content of the user, such as from the web feed service 120 when acting as an intermediate service or directly from the content service 202, itself. In yet another example, presence data is obtained for user's that are included in a list of contacts, and therefore the obtaining is performed for user's that have an increased likelihood of being of interest to a user that is to receive the web feed. A variety of other examples are also contemplated.

The web feed is output with the presence data concurrently (block 308). As shown in FIG. 2, for instance, the web feed 116(n) stored locally by the client 104(n) is output for display on the display device 230 in a user interface 228. The user interface 228 includes the web feed 116(n) "Andy added a post 'What a Great Weekend'" that describes content of the user, e.g., "Andy". The user interface 228 also includes the presence data "he is online now" indicating that the user that originated the content is available for communication. Therefore, the recipient of the web feed (e.g., the client 104(n)) may readily determine whether the originating user is available for communication. Thus, communication may be initiated with the user based on the presence data (block 310) without "guessing" as to the presence of the user.

Additionally, through use of the web feed describing content of the user, the recipient (e.g., the user of the client 104(n)) may also choose to interact with the content described in the web feed. For example, the user may choose to manually navigate to content described in the web feed by entering a URL of the content obtained from the web feed (block 312). In another example, the user may select a link in the user interface 228, e.g., selection of the underlined text "What a Great Weekend" may result in navigation to corresponding content (e.g., the post) at the content service 202. In yet another example, the user may read the description of the content provided in the web feed itself, e.g., a summary of an article. A variety of other examples are also contemplated.

Figure 4:
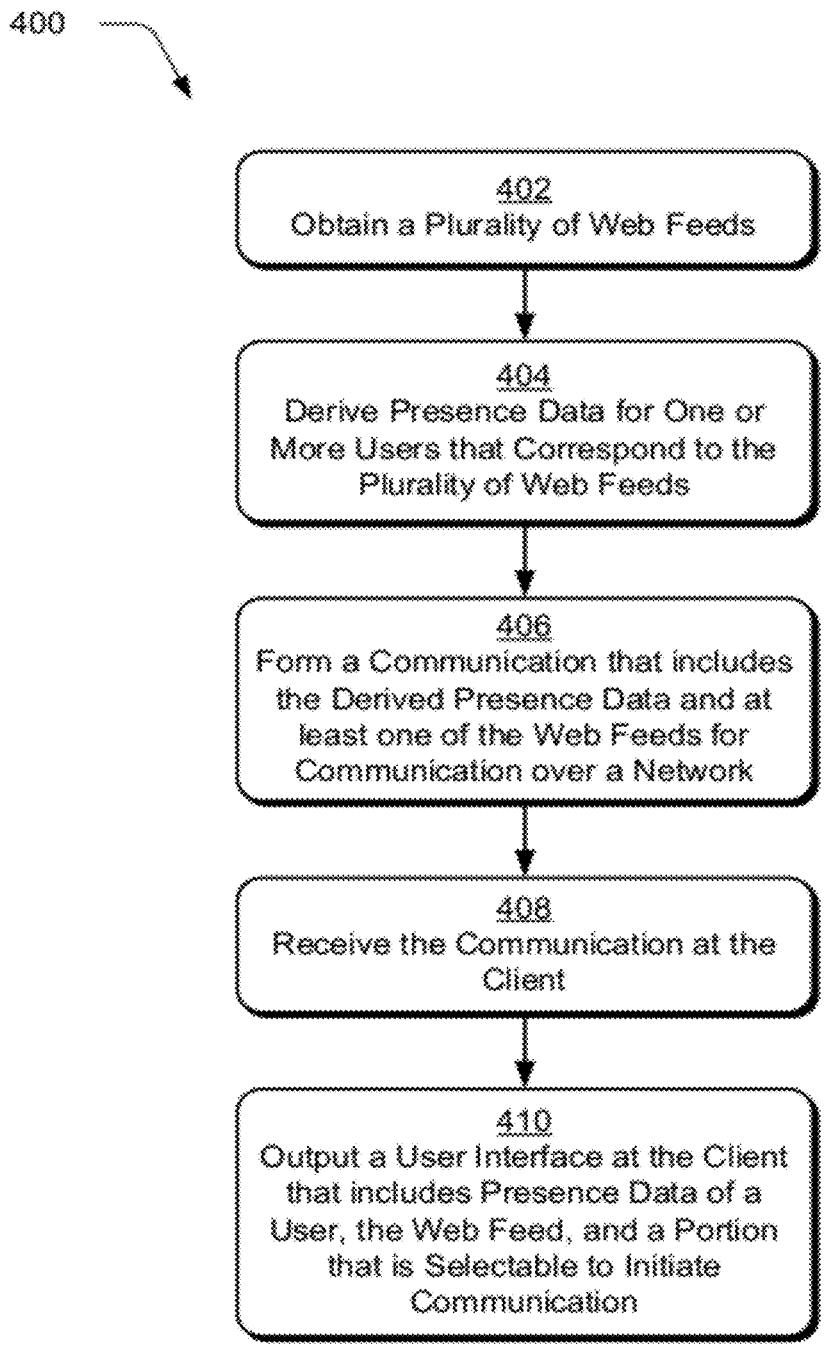
FIG. 4 is a flow diagram depicting a procedure in an exemplary implementation in which a plurality of web feeds and a plurality of presence data is obtained by an intermediate web feed service of FIG. 2 for communication to a client of FIG. 2.

FIG. 4 depicts a procedure 400 in an exemplary implementation in which a plurality of web feeds and a plurality of presence data is obtained by an intermediate web feed service for communication to a client of FIG. 2. During the discussion of FIG. 4, reference will also be made to an exemplary implementation 500 of FIG. 5 in which a user interface is output and displayed on a client configured as a wireless phone, the interface including a plurality of presence data and web feeds obtained via the procedure of FIG. 4.

A plurality of web feeds is obtained (block 402). For example, the web feed service 120 may obtain web feeds from a plurality of content services 202 that describe content available via the respective services. The plurality of web feeds may be in the same or differing formats, such as RSS, Atom, and so on.

Presence data is derived for one or more users that correspond to the plurality of web feeds (block 404). The web feed service 120, for example, may examine each of the web feeds to determine which user(s) correspond to the respective web feeds, e.g., originated the content described in the web feeds. The web feed service 120 may then query a plurality of presence services 204 to find the determined user's presence in relation to the respective services, such as whether the user is logged on to an instant messaging service, is available via a wireless phone, and so on. Presence data which describes the determined presences of the users may then be aggregated for output.

A communication is formed that includes the derived presence data and at least one of the web feeds for communication over a network (block 406). Continuing with the previous example, the communication may be formed as an aggregated web feed that includes the presence data of users that correspond to the respective web feeds as metadata within the aggregated web feed.

Figure 5:
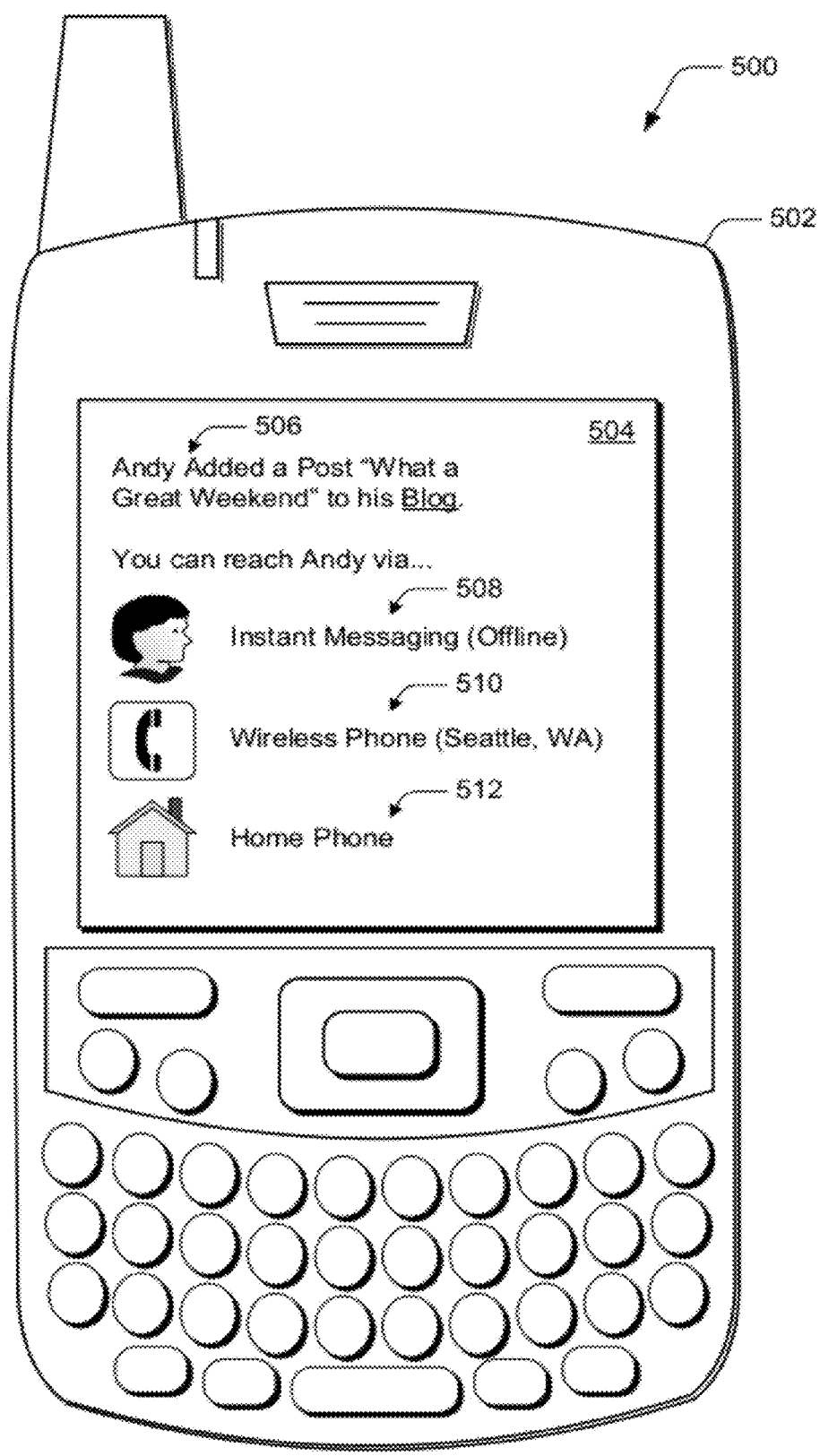
FIG. 5 is an illustration of an exemplary implementation in which a user interface is output and displayed on a client configured as a wireless phone, the interface including a plurality of presence data and web feeds obtained via the procedure of FIG. 4.

The communication is received at the client (block 408). A user interface is then output at the client that includes presence data of a user, the web feed and a portion that is selectable to initiate communication (block 410). Referring now to FIG. 5, for instance, a client 502 configured as a wireless phone is illustrated having an output of a user interface 504. The user interface 504 includes a part 506 of the web feed illustrated as "Andy added a post 'What a Great Weekend' to his Blog".

The user interface 504 also includes data 508, 510, 512 referencing different communication techniques that may be utilized to contact "Andy", i.e., the user that corresponds to the content described in the web feed. For example, data 508 includes presence data that indicates that Andy is not available via instant messaging because he is "offline".

Data 510, on the other hand, indicates that Andy is available via his wireless phone and also indicates where Andy is located. For example, the wireless phone may include a Global Positioning System (GPS) unit that provides presence data indicating "where" Andy is located. In another example, the location may be obtained from a wireless provider. A variety of other examples are also contemplated.

Data 512 references a home phone of Andy, but does not include presence data. Data 512, as well as the other data 508, 510 pertaining to different communication techniques, may be selectable to initiate a communication via the respective techniques. For example, a cursor control device may be used to select the data 510 "wireless phone" to initiate a telephone conversation with Andy via his wireless phone. Thus, the user interface 504 provides a concurrent display of a variety of communication techniques which may be utilized to communicate with a user that corresponds to content described in a web feed. A user, when viewing the user interface 504, may then readily determine how best to communicate with Andy based on the presence data as well as the techniques that are available to communicate with Andy.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:
1. A method, comprising:
  obtaining, by a computing device, a web post describing content of an originating user published over a network;
  obtaining, by the computing device, presence data describing an online presence of the originating user, wherein a source of the presence data describing the online presence of the originating user comprises a presence service and a source of the web post describing the content comprises another service different than the presence service;

identifying, based at least in part on the web post, one or more other users included in a list of contacts of a recipient of the web post;

obtaining presence data describing an online presence of the determined one or more other users included in the list of contacts of the recipient of the web post; and concurrently outputting, by the computing device to the recipient, the web post with the presence data of the originating user to indicate whether the originating user and the one or more other users are available to communicate with the recipient and to identify two or more techniques to electronically communicate, based in part on the presence data or the online presence, with at least one of the originating user or the one or more other users.

2. A method as described in claim 1, wherein the web post is formatted in compliance with Real Simple Syndication (RSS) or Atom.

3. The method as described in claim 1, wherein the presence data describing the online presence of the originating user and the online presence of the one or more other users indicates, using text from a natural language, whether the originating user and the one or more other users are available to communicate with the recipient.

4. The method as described in claim 1, wherein the web post identifies a computing device used by at least one of the originating user or the one or more other users.

5. The method as described in claim 1, wherein the two or more techniques to electronically communicate are web-page based communication techniques.

6. A computer-implemented method, comprising:

obtaining, by a computing device, a plurality of web posts describing content of one or more originating users published over a network;

deriving, by the computing device, presence data describing online presence information for the one or more originating users that correspond to the plurality of web posts, wherein a source of the presence data describing the online presence information comprises a presence service and a source of the plurality of web posts comprises another service different than the presence service;

outputting, by the computing device, the plurality of web posts and the presence data for the one or more originating users concurrently, the presence data indicating whether the one or more originating users are available to communicate with a recipient of the plurality of web posts via two or more techniques to electronically communicate, wherein at least a portion of the presence data is selectable to initiate communication with the one or more originating users via the two or more techniques to electronically communicate, the presence data being incorporated within the content of the one or more originating users;

identifying, based at least in part on a portion of the plurality of web posts, one or more other users included in a list of contacts of the recipient of the plurality of web posts; and obtaining an online presence of the identified one or more other users included in the list of contacts of the recipient of the plurality of web posts.

7. A computer implemented method as described in claim 6, wherein the presence data describing the online presence information for the one or more originating users indicates, using text from a natural language, whether the one or more originating users are available to communicate with the recipient.

8. A computer-implemented method as described in claim 6, wherein the plurality of web posts identifies a computing device used by at least one of the one or more originating users or the one or more other users.

9. A computer-implemented method as described in claim 6, wherein the two or more techniques to electronically communicate are web-page based communication techniques.

10. A system comprising:

a processor; and a display device communicatively coupled to the processor, the display device outputting a user interface that includes:

a web post describing content generated by an originating user published over a network;

presence data describing an online presence of the originating user and an online presence of one or more other users included in a list of contacts of a recipient of the web post, the presence data corresponds to two or more particular communication techniques, wherein:

a source of the presence data describing the online presence of the originating user comprises a presence service and a source of the web post comprises another service different than the presence service; and the presence data and the web post are displayed concurrently to indicate whether the originating user and the one or more other users are available to communicate with the recipient of the web post and to identify how the originating user and the one or more other users are available;

the presence data is incorporated within the content generated by the originating user, the one or more other users having been previously identified based at least in part on the web post; and one or more portions are selectable to initiate communication with the originating user and the one or more other users via the two or more particular communication techniques.

11. The system as described in claim 10, wherein the presence data describing the online presence of the originating user and the online presence of the one or more other users indicates, using text from a natural language, whether the originating user and the one or more other users are available to communicate with the recipient.

12. The system as described in claim 10, wherein the web post identifies a computing device used by at least one of the originating user or the one or more other users.

13. The system as described in claim 10, wherein the two or more particular communication techniques are web-page based communication techniques.

* * * * *